Patented July 10, 1934

1,966,203

UNITED STATES PATENT OFFICE 1,966,203

METHOD OF AND MATERIAL FOR REMOVING SOLDERING FLUXES

James H. Gravell, Elkins Park, Pa., assignor to American Chemical Paint Company, Ambler, Pa., a corporation of Delaware No Drawing. Application March 26, 1932, Serial No. 601,460

10 Claims. (Cl. 148—8)

This invention relates to an improved method of cleaning or preparing articles, particularly metal articles, so as to properly condition or preserve them, especially where they are to be subsequently treated or finished as by painting or the like. It is particularly useful in removing residues of soldering fluxes from metals of various kinds prior to the time that they are painted.

By way of example reference is made to the fabrication of sheet metal, especially sheet steel such as is used in the manufacture of sheet steel automobile bodies. In this art solder is employed for hiding seams, defects in stamping and/or general repairs incident to accidental injuries, and, as is well known in the art, soldering fluxes must be employed in order to make the solder hold to the metal. Such fluxes are acid in nature and, if permitted to remain on the article, they will cause it to rust with great rapidity, so that it is necessary to thoroughly remove the rust and otherwise clean the metal before it is ready to receive the paint or other rust-proof coating. Furthermore, the residues of the soldering flux itself are highly objectionable and should be removed before the article is finally finished.

With the foregoing in mind the particular objects of my invention will be better understood and they may be said to consist in the provision of a process of and a material for removing soldering fluxes; to provide an inexpensive and easily transportable dry material for carrying out the process disclosed; to improve the quality or character of the finished article, i. e., the article after it has received its coat of paint or other rust-proof covering; to reduce the cost of preparing articles, especially metal articles, for the painting or rust-proofing operation; to prevent the development of defects in the painted finish and in general to improve the art of preparing articles for painting or rust-proofing.

By way of specific example I may say that I have discovered that if the soldering fluxes employed in the fabrication of steel sheets are effectively removed from the metal immediately after the soldering operation, the metal will remain substantially free from objectionable rust during the time which often elapses between the soldering operation and the final preparation of the metal for the application of the paint or other rust-proof coating. This, of course, materially reduces the effort and expense necessary to properly clean the work in preparing it for the final coating.

I have discovered that the foregoing objects may be obtained by the use of certain wetting agents dissolved in water and then applied in a forceful manner to the soldered areas. Such agents effectively wet the metal in preference to the soldering flux and therefore tend to replace the flux on the metal so that when the metal is wiped dry, as with a cloth, substantially all of the soldering flux is removed, the metal remaining free from rust during the time that it is awaiting its final preparation for painting.

My improved material may be applied to the article in any manner which brings it into intimate contact with the soldering fluxes and with the metal such as by brushing, wiping, dipping or spraying, all of which will hereinafter be referred to as "scrubbing".

Generally stated, my process consists in scrubbing the metal with a solution containing a dissolved wetting agent potentially compatible with both acids and alkalies and then removing the resultant residue. Such wetting agents as alcohols, esters, ethers, ketones and certain sulphonic acids and salts thereof, may be used. I prefer, however, the sulphonated bodies such as those containing the acid radical of the sulphonated aromatic hydrocarbon having an isopropyl radical in the nucleus. Neomerpin is the commercial name of such a material, which is commercially obtainable as a sulphonic acid or as the sodium salt of this sulphonic acid.

I further find that when the soldering fluxes heavily coat the metal, the addition of an alkali to my solution is of advantage as this enables my solution to neutralize the soldering fluxes and the amount of wetting agent required may be reduced. Such alkalies as caustic soda, soda ash, borax, tri-sodium phosphate, etc., produce desirable results. I prefer the tri-sodium phosphate because it is non-deliquescent and inexpensive.

As my solution is repeatedly used, more and more of the alkali is neutralized until a point is finally reached when the alkali is completely neutralized. So in order to guard against the application of ineffective solution, I find it well to introduce into my solution a chemical indicator which by change of color warns the operator when the solution has ceased to be effective. Any suitable indicator for this purpose may be used, but I prefer phenolphthalein which colors the solution red as long as the solution is effective.

A suitable composition for dissolving in water to produce my solution for removing soldering flux may be made by admixing:—

| | |
|---|---|
| Tri-sodium phosphate | .9599 lb. |
| The sodium salt of the sulphonic acid of the aromatic hydro-carbon containing an iso-propyl radical in the nucleus | .0400 lb. |
| Phenolphthalein | .0001 lb. |

This aggregation is thoroughly mixed and forms substantially a dry granular mixture. To make up a solution ready for use I dissolve eight (8) ounces of this material in one (1) gallon of water. This forms a red solution.

To carry out my process, after the work has been soldered I apply my solution to the soldered areas with a brush or swab until it remains red on the metal, showing that the soldering fluxes have been completely neutralized. I then remove the resultant residue from the metal by wiping with a dry rag. This removes the soldering flux from the metal and enables the metal to remain free from rust until it is ready for preparing for painting, which may be within a few hours or after the lapse of several days.

I claim:—

1. The method of removing soldering fluxes which includes wetting the article with a solution containing the acid radical of a sulphonated aromatic hydrocarbon having an iso-propyl radical in the nucleus, and then removing the resultant residue.

2. The method of removing soldering fluxes which includes scrubbing the article with a solution containing the acid radical of a sulphonated aromatic hydrocarbon having an iso-propyl radical in the nucleus, compatible with both acids and alkalies, and a dissolved alkali, and then removing the resultant residue.

3. The method of removing soldering fluxes which includes scrubbing the article with a solution containing the acid radical of a sulphonated aromatic hydrocarbon having an iso-propyl radical in the nucleus, compatible with both acids and alkalies, a dissolved alkali and an indicator, using the said solution in sufficient quantity to maintain its alkalinity, and then removing the resultant residue.

4. The method of removing soldering fluxes which includes scrubbing the article with a solution containing the acid radical of a sulphonated aromatic hydrocarbon having an iso-propyl radical in the nucleus and tri-sodium phosphate and then removing the resultant residue.

5. The method of removing soldering fluxes which includes scrubbing the article with a solution containing the acid radical of a sulphonated aromatic hydrocarbon having an iso-propyl radical in the nucleus, tri-sodium phosphate and phenolphthalein.

6. A material for dissolving in water to produce a solution for removing soldering fluxes, being an admixture comprising a body having an acid radical of a sulphonated aromatic hydrocarbon containing an iso-propyl radical in the nucleus and an alkali.

7. A material for dissolving in water to produce a solution for removing soldering fluxes, being an admixture comprising a body having an acid radical of a sulphonated aromatic hydrocarbon containing an iso-propyl radical in the nucleus, an alkali and an indicator.

8. A material for dissolving in water to produce a solution for removing soldering fluxes, being an admixture comprising a body having an acid radical of a sulphonated aromatic hydrocarbon containing an iso-propyl radical in the nucleus and tri-sodium phosphate.

9. A material for dissolving in water to produce a solution for removing soldering fluxes, being an admixture comprising a body having an acid radical of a sulphonated aromatic hydrocarbon containing an iso-propyl radical in the nucleus, an alkali and phenolphthalein.

10. A material for dissolving in water to produce a solution for removing soldering fluxes, being an admixture comprising the sodium salt of the sulphonic acid of an aromatic hydrocarbon containing an iso-propyl radical in the nucleus, tri-sodium phosphate and phenolphthalein.

JAMES H. GRAVELL.